US010923732B2

(12) United States Patent
Yoon et al.

(10) Patent No.: US 10,923,732 B2
(45) Date of Patent: Feb. 16, 2021

(54) METHOD FOR PRODUCING ROLL-TYPE GAS DIFFUSION LAYER HAVING EXCELLENT SPREADING PROPERTY

(71) Applicant: KOLON INDUSTRIES, INC., Seoul (KR)

(72) Inventors: Joon Young Yoon, Seoul (KR); Da Kyoung Yong, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 12 days.

(21) Appl. No.: 16/340,908

(22) PCT Filed: Dec. 19, 2017

(86) PCT No.: PCT/KR2017/014978
§ 371 (c)(1),
(2) Date: Apr. 10, 2019

(87) PCT Pub. No.: WO2018/124581
PCT Pub. Date: Jul. 5, 2018

(65) Prior Publication Data
US 2019/0245214 A1 Aug. 8, 2019

(30) Foreign Application Priority Data
Dec. 29, 2016 (KR) .................. 10-2016-0181862

(51) Int. Cl.
H01M 4/88 (2006.01)
D01F 9/16 (2006.01)
D21H 13/50 (2006.01)
D21H 25/06 (2006.01)
D21H 19/10 (2006.01)
D21H 17/70 (2006.01)
H01M 8/0245 (2016.01)
D21H 17/48 (2006.01)
D21H 25/04 (2006.01)
D21H 19/84 (2006.01)
H01M 8/0234 (2016.01)
D21H 19/20 (2006.01)

(52) U.S. Cl.
CPC ............ H01M 4/8807 (2013.01); D01F 9/16 (2013.01); D21H 13/50 (2013.01); D21H 17/48 (2013.01); D21H 17/70 (2013.01); D21H 19/10 (2013.01); D21H 19/20 (2013.01); D21H 19/84 (2013.01); D21H 25/04 (2013.01); D21H 25/06 (2013.01); H01M 8/0234 (2013.01); H01M 8/0245 (2013.01); Y02P 70/50 (2015.11)

(58) Field of Classification Search
CPC ........ D21H 13/50; D21H 25/06; D21H 17/48; D21H 17/70; D21H 19/10; D21H 19/20; D21H 19/84; D21H 25/04; D21H 11/12; D21H 13/08; D21H 17/46; H01M 4/8807; H01M 8/0234; D04H 1/4242; D01F 9/16; D01F 9/12
See application file for complete search history.

(56) References Cited

U.S. PATENT DOCUMENTS

| 8,747,796 | B2 * | 6/2014 | Lee ............ D04H 1/4242 156/148 |
| 2006/0180798 | A1 * | 8/2006 | Chida ............ D21H 13/50 252/502 |
| 2006/0214320 | A1 | 9/2006 | Ko et al. |
| 2009/0068537 | A1 * | 3/2009 | Kawakami ........ H01M 8/1023 429/494 |
| 2011/0286910 | A1 * | 11/2011 | Lee ............ D04H 1/64 423/445 R |
| 2013/0323620 | A1 * | 12/2013 | Tatsuno ........ H01M 4/8875 429/482 |
| 2014/0011118 | A1 * | 1/2014 | Lee ............ D21H 13/12 429/534 |
| 2015/0102268 | A1 | 4/2015 | Kim et al. |
| 2016/0265144 | A1 * | 9/2016 | Yoon ............ D01F 9/16 |
| 2016/0322646 | A1 * | 11/2016 | Kajiwara ........ H01M 8/0234 |

(Continued)

FOREIGN PATENT DOCUMENTS

EP 2 857 355 A1 4/2015
EP 3565043 A1 * 11/2019 ............ D21H 19/10

(Continued)

OTHER PUBLICATIONS wINDLE et al., IN "Carbon fibres from cellulosic precursors: a review," j mATER sCI vol. 47, pp. 4236-4250 (Year: 2012).*
Shunjin Peng et al., "Lyocell Fibers as the Precursor of Carbon Fibers", Journal of Applied Polymer Science, Sep. 17, 2003, pp. vol. 90, No. 7, 1941-1947.
International Search Report of PCT/KR2017/014978 dated Mar. 27, 2018 [PCT/ISA/210].

* cited by examiner

Primary Examiner — Jose A Fortuna
(74) Attorney, Agent, or Firm — Sughrue Mion, PLLC

(57) ABSTRACT

A method for producing a roll-type gas diffusion layer is disclosed. The method includes preparing a carbon paper from carbon fiber chops having a low modulus of 10 to 100 Gpa; impregnating the prepared carbon paper with a phenol resin, and then carbonizing the resin-impregnated carbon paper at 1,800 to 2,400° C.; forming a microporous polytetrafluoroethylene resin layer on one side of the carbonized carbon paper, to prepare a gas diffusion layer sheet; and winding the prepared gas diffusion layer sheet on a roll. Since the roll of gas diffusion layer is formed using the carbon fiber chops having a low modulus, the gas diffusion layer exhibits excellent and uniform spreading properties. Therefore, sealing between the gas diffusion layer and the fuel cell separation plate is reliably secured without using a separate binder.

3 Claims, No Drawings

(56) References Cited

U.S. PATENT DOCUMENTS

| | | | |
|---|---|---|---|
| 2017/0301923 A1* | 10/2017 | Lee | H01M 4/8657 |
| 2018/0145335 A1* | 5/2018 | Kajiwara | H01M 4/8875 |
| 2019/0165379 A1* | 5/2019 | Kajiwara | H01M 4/96 |
| 2019/0245214 A1* | 8/2019 | Yoon | D01F 9/16 |

FOREIGN PATENT DOCUMENTS

| | | | |
|---|---|---|---|
| JP | 2010-244957 A | | 10/2010 |
| KR | 10-2005-0054467 A | | 6/2005 |
| KR | 10-2005-0116153 A | | 12/2005 |
| KR | 10-2011-0128156 A | | 1/2011 |
| KR | 10-2012-0023584 A | | 3/2012 |
| KR | 20120023584 A | * | 3/2012 |
| WO | 2005/024981 A2 | | 3/2005 |
| WO | 2013/147174 A1 | | 10/2013 |

METHOD FOR PRODUCING ROLL-TYPE GAS DIFFUSION LAYER HAVING EXCELLENT SPREADING PROPERTY

CROSS REFERENCE TO RELATED APPLICATIONS

This application is a National Stage of International Application No. PCT/KR2017/014978, filed Dec. 19, 2017, claiming priority to Korean Patent Application No. 10-2016-0181862, filed Dec. 29, 2016.

TECHNICAL FIELD

The present invention relates to a method for producing a roll-type gas diffusion layer having excellent spreading properties, and more particularly, to a method for producing a roll-type gas diffusion layer having excellent spreading properties, which includes: preparing carbon fiber chops having a low modulus; winding the same on a roll to prepare a roll-type wound gas diffusion layer; cutting the gas diffusion layer into a sheet form in a predetermined length, thus to prepare a sheet-like gas diffusion layer which is evenly spreading without lifting, that is, has excellent spreadabilities (hereinafter, briefly referred to as 'spreading properties').

BACKGROUND ART

A gas diffusion layer is a membrane which allows water generated by combining hydrogen ions and oxygen ions as well as hydrogen ions degraded between electrodes as fuel cell components to pass therethrough.

As disclosed in Korean Patent Laid-Open Publication No. 10-2005-0054467, the gas diffusion layer is typically produced by carbonizing a carbon paper containing a phenol resin impregnated therein, and then forming a microporous polytetrafluoroethylene resin layer on one of both sides of the carbonized carbon paper.

At the early commercialization of the gas diffusion layer, a sheet-like gas diffusion layer was prepared and supplied. However, in recent years, for easy delivery and mass production, a gas diffusion layer wound in a roll form (hereinafter, briefly referred to as a 'roll-type gas diffusion layer') is mainly produced and supplied.

As for a conventional method of producing a roll-type gas diffusion layer, the method includes: (i) introducing polyacrylonitrile (PAN)-based carbon fiber chops or pitch-based carbon fiber chops, which have a strength of at least 3.0 Gpa and a modulus of at least 230 Gpa, into a paper pulp-manufacturing apparatus along with a binder fiber, a surfactant, a thickener, and an anti-foaming agent, so as to prepare a sheet-like carbon paper; (ii) impregnating the prepared carbon paper with a phenol resin, carbonizing the same at a temperature of 1,800° C. or more, and then forming a microporous polytetrafluoroethylene (PTFE) layer on one of both sides of the carbonized carbon paper to prepare a sheet-like gas diffusion layer; and (iii) winding the prepared sheet-like gas diffusion layer on a roll, which are performed in this order, thereby producing a roll-type gas diffusion layer.

Since the roll-type gas diffusion layer produced according to the above conventional method is prepared as carbon fiber chops having a high modulus of 230 Gpa or more, when the roll-type wound gas diffusion layer is cut into a sheet form, the sheet-like gas diffusion layer is not evenly spreading but lifted. In other words, spreading properties are deteriorated, and therefore, sealing between the gas diffusion layer on the cut sheet and a fuel cell separation plate is not reliably secured, thereby causing problems such as leakage or flooding.

In order to solve the above-described problems, when sealing between the sheet-like gas diffusion layer having poor spreading properties as described above and the fuel cell separation plate using a separate binder, however, there is another problem such as a deterioration in electrical conductivity.

DISCLOSURE

Technical Problem

Accordingly, it is an object of the present invention to provide a method for producing a roll-type gas diffusion layer which is evenly spreading without lifting, that is, has excellent spreading properties, when cutting the gas diffusion layer wound on a roll into in a sheet form in a desired predetermined length to prepare a sheet-like gas diffusion layer.

Technical Solution

In order to accomplish the above-described object, the present invention provides a method for producing a roll-type gas diffusion layer, which includes: preparing a carbon paper by using carbon fiber chops having a low modulus of 10 to 100 Gpa; impregnating the prepared carbon paper with a phenol resin or the like, and then carbonizing the same at 1,800 to 2,400° C.; forming a microporous polytetrafluoroethylene resin layer on one of both sides of the carbonized carbon paper, thus to prepare a sheet-like gas diffusion layer; and then, winding the prepared sheet-like gas diffusion layer on a roll, thereby producing the roll-type gas diffusion layer.

Advantageous Effects

Since the roll-type gas diffusion layer produced by the present invention is formed by using the carbon fiber chops having a low modulus, the gas diffusion layer cut into a sheet form is evenly spreading without lifting, that is, exhibits excellent spreading properties.

Therefore, sealing between the gas diffusion layer and the fuel cell separation plate is reliably secured without using a separate binder, thereby eliminating problems such as leakage or flooding, and preventing a deterioration in electrical conductivity due to use of a separate binder.

BEST MODE

Hereinafter, the present invention will be described in detail.

A method for producing a roll-type gas diffusion layer having excellent spreading properties according to the present invention may include: (i) performing heat treatment on a cellulose fiber as a carbon fiber precursor at a temperature of 1,750 to 2,450° C. to prepare a carbon fiber having a strength of 0.5 to 1.2 Gpa and a modulus of 10 to 100 Gpa; (ii) cutting the prepared carbon fiber in a length of 3 to 56 mm to prepare carbon fiber chops, and then introducing the same into a paper pulp-manufacturing apparatus along with a binder fiber, a surfactant, a thickener and an anti-foaming agent to prepare a sheet-like carbon paper; (iii) impregnating the prepared carbon paper with a resin, carbonizing the same at 1,800 to 2,400° C., and then, forming a microporous polytetrafluoroethylene resin layer on one of both sides of the carbonized carbon paper to prepare a sheet-like gas diffusion layer; and (iv) winding the prepared sheet-like gas diffusion layer on a roll.

In particular, the present invention may firstly perform heat treatment on a cellulose fiber as a carbon fiber precursor at a highest temperature of 1,750 to 2,450° C. to prepare a carbon fiber having a strength of 0.5 to 1.2 Gpa and a modulus of 10 to 100 Gpa.

Herein, the cellulose fiber as the carbon fiber precursor may include an acetate fiber, a rayon fiber, a Lyocell fiber, a cotton fiber or a lignin fiber, etc.

If performing heat treatment on the cellulose fiber as the carbon fiber precursor at a low temperature of less than 1,750° C., the modulus of the carbon fiber is reduced to less than 10 Gpa and some elements such as nitrogen (N) other than carbon (C) may remain in the carbon fiber and serve as impurities, thereby deteriorating a performance of the final product, that is, the gas diffusion layer. On the other hand, if performing heat treatment at a temperature of more than 2,450° C., the carbon fiber precursor is under graphitization to cause adverse effects upon workability and vending property.

The carbon fiber prepared as described above may have a strength of 0.5 to 1.2 Gpa and a modulus of 10 to 100 Gpa.

In this regard, if the strength of the carbon fiber is less than 0.5 Gpa, thermal conductivity and electrical conductivity may be deteriorated due to a large number of impurities other than carbon. On the other hand, if the strength exceeds 1.2 Gpa, graphitization is too much proceeding during performing heat treatment, hence resulting in fragile products, that is, causing a deterioration in workability. In addition, if the modulus is less than 10 Gpa, the carbon fiber may be easily torn, and if the modulus exceeds 100 Gpa, the gas diffusion layer wound on a roll does not easily restore, thereby causing a problem of deterioration in performance.

Preferably, the carbon fiber prepared as described above has a diameter of 6 to 10 μm, an electrical resistivity of 0.0001 to 0.9 Ω·cm and a density of 1.4 to 1.5 g/cm².

If the diameter of the carbon fiber is less than 6 μm, the carbon fiber may be fragile or easy to break. If the diameter exceeds 10 μm, it is difficult to uniformly carbonize the entirety of the carbon fiber including the inner side thereof, hence exhibiting non-uniformity. In addition, if the electrical resistivity is beyond the above range, a large number of impurities are contained or carbonization is too much proceeding, which are not preferable.

Next, after cutting the prepared carbon fiber in a length of 3 to 56 mm to prepare carbon fiber chops, the carbon fiber chops, as well as a binder fiber, a surfactant, a thickener and an anti-foaming agent, may be introduced into a paper pulp-manufacturing apparatus to prepare a sheet-like carbon paper.

In this regard, if the carbon fiber is cut in a length of less than 3 mm, it may be difficult to prepare a carbon paper. Further, a larger amount of binder relative to an amount of carbon fiber chops is required, and the binder portion becomes hollow during the carbonization, hence causing a drastic deterioration in the performance. On the other hand, if the carbon fiber is cut in a length of more than 56 mm, dispersion properties are drastically deteriorated to cause a difficulty in production of a carbon paper with uniformity. Further, the concentration of a paper pulp is decreased to lose economical efficiency.

The carbon paper prepared as described above may have a weight of 10 to 100 g/m².

Next, after impregnating the prepared carbon paper with a resin and carbonizing the same at a highest temperature of 1,800 to 2,400° C. in a nitrogen atmosphere, a microporous polytetrafluoroethylene resin layer may be formed on one of both sides of the carbonized carbon paper to prepare a sheet-like gas diffusion layer, followed by winding the prepared sheet-like gas diffusion layer on a roll, thereby producing a roll-type gas diffusion layer.

Herein, the resin used for impregnating the carbon paper may a phenol resin or a polyvinylphenol resin.

The roll-type gas diffusion layer produced by the present invention is formed by using carbon fiber chops having a low modulus, such that the gas diffusion layer cut into a sheet form may be evenly spreading without lifting, that is, have excellent spreading properties.

Therefore, even without using a separate binder, sealing between the gas diffusion layer and a fuel cell separation plate is reliably secured, thereby eliminating problems such as leakage or flooding, and preventing a deterioration in the electrical conductivity due to use of the separate binder.

Hereinafter, the present invention will be described in more detail by means of examples and comparative examples described below.

However, it should not be construed that the scope of the present invention is merely limited to the following examples.

Example 1

Heat treatment was performed on an acetate fiber as a carbon fiber precursor at 1,800° C. to prepare a carbon fiber having a strength of 0.7 Gpa, a modulus of 17 Gpa, a diameter of 8 μm, an electrical resistivity of 0.1 Ω·cm and a density of 1.45 g/cm³.

Next, the prepared carbon fiber was cut in a length of 20 mm to prepare carbon fiber chops, followed by performing heat treatment on the prepared carbon fiber chops at 500° C. for 3 minutes, thereby removing a residual sizing oil.

Then, after mixing the heat-treated carbon fiber chops with a polyvinyl alcohol fiber (a binder fiber), a surfactant, a thickener and an anti-foaming agent to prepare a mixture, the mixture was introduced into a paper pulp-manufacturing Chester to prepare a carbon paper having a weight of 25 g/m².

Next, after impregnating the carbon paper prepared as described above with a phenol resin, drying and carbonizing the same at a temperature of 2,200° C., a microporous polytetrafluorcethylene resin layer was formed on one of both sides of the carbonized carbon paper by a coating process, thereby preparing a sheet-like gas diffusion layer.

Then, the sheet-like gas diffusion layer prepared as described above was wound on a roll while slitting a peripheral portion thereof, thus to produce a roll-type gas diffusion layer.

Thereafter, the gas diffusion layer produced as described and wound on the roll was cut in a length of 300 mm while unwinding the same to provide a sheet-like gas diffusion layer. As a result, the sheet-like gas diffusion layer cut as described above was evenly spreading along a radius of curvature of the roll without lifting, that is, exhibited excellent spreading properties.

Example 2

Heat treatment was performed on a rayon fiber as a carbon fiber precursor at 2,000° C. to prepare a carbon fiber having a strength of 0.9 Gpa, a modulus of 60 Gpa, a diameter of 6 μm, an electrical resistivity of 0.2 Ω·cm and a density of 1.45 g/cm³.

Next, the prepared carbon fiber was cut in a length of 5 mm to prepare carbon fiber chops, followed by performing heat treatment on the prepared carbon fiber chops at 500° C. for 3 minutes, thereby removing a residual sizing oil.

Then, after mixing the heat-treated carbon fiber chops with a polyvinyl alcohol fiber (a binder fiber), a surfactant, a thickener and an anti-foaming agent to prepare a mixture, the mixture was introduced into a paper pulp-manufacturing Chester to prepare a carbon paper having a weight of 40 g/m².

Next, after impregnating the carbon paper prepared as described above with a phenol resin, drying and carbonizing the same at a temperature of 2,200° C., a microporous polytetrafluoroethylene resin layer was formed on one of both sides of the carbonized carbon paper by a laminating process, thereby preparing a sheet-like gas diffusion layer.

Then, the sheet-like gas diffusion layer prepared as described above was wound on a roll while slitting a peripheral portion thereof, thus to produce a roll-type gas diffusion layer.

Thereafter, the gas diffusion layer produced as described and wound on the roll was cut in a length of 300 mm while unwinding the same to provide a sheet-like diffusion layer. As a result, the sheet-like gas diffusion layer cut as described above was evenly spreading along a radius of curvature of the roll without lifting, that is, exhibited excellent spreading properties.

Example 3

Heat treatment was performed on a Lyocell fiber as a carbon fiber precursor at 2,400° C. to prepare a carbon fiber having a strength of 1.2 Gpa, a modulus of 90 Gpa, a diameter of 10 μm, an electrical resistivity of 0.2 Ω·cm and a density of 1.45 g/cm³.

Next, the prepared carbon fiber was cut in a length of 50 mm to prepare carbon fiber chops, followed by performing heat treatment on the prepared carbon fiber chops at 500° C. for 3 minutes, thereby removing a residual sizing oil.

Then, after mixing the heat-treated carbon fiber chops with a polyvinyl alcohol fiber (a binder fiber), a surfactant, a thickener and an anti-foaming agent to prepare a mixture, the mixture was introduced into a paper pulp-manufacturing Chester to prepare a carbon paper having a weight of 60 g/m².

Next, after impregnating the carbon paper prepared as described above with a phenol resin, drying and carbonizing the same at a temperature of 2,200° C., a microporous polytetrafluoroethylene resin layer was formed on one of both sides of the carbonized carbon paper by a coating process, thereby preparing a sheet-like gas diffusion layer.

Then, the sheet-like gas diffusion layer prepared as described above was wound on a roll while slitting a peripheral portion thereof, thus to produce a roll-type gas diffusion layer.

Thereafter, the gas diffusion layer produced as described and wound on the roll was cut in a length of 300 mm while unwinding the same to provide a sheet-like gas diffusion layer. As a result, the sheet-like gas diffusion layer cut as described above was evenly spreading along a radius of curvature of the roll without lifting, that is, exhibited excellent spreading properties.

Comparative Example 1

Heat treatment was performed on an acrylonitrile (PAN) fiber as a carbon fiber precursor at 1,450° C. to prepare a carbon fiber having a strength of 3.5 Gpa and a modulus of 2200 Gpa.

Next, the prepared carbon fiber was cut in a length of 20 mm to prepare carbon fiber chops, followed by performing heat treatment on the prepared carbon fiber chops at 500° C. for 3 minutes, thereby removing a residual sizing oil.

Then, after mixing the heat-treated carbon fiber chops with a polyvinyl alcohol fiber (a binder fiber), a surfactant, a thickener and an anti-foaming agent to prepare a mixture, the mixture was introduced into a paper pulp-manufacturing Chester to prepare a carbon paper having a weight of 25 g/m².

Next, after impregnating the carbon paper prepared as described above with a phenol resin, drying and carbonizing the same at a temperature of 2,200° C., a microporous polytetrafluorcethylene resin layer was formed on one of both sides of the carbonized carbon paper by a coating process, thereby preparing a sheet-like gas diffusion layer.

Then, the sheet-like gas diffusion layer prepared as described above was wound on a roll while slitting a peripheral portion thereof, thus to produce a roll-type gas diffusion layer.

Thereafter, the gas diffusion layer produced as described and wound on the roll was cut in a length of 300 mm while unwinding the same to provide a sheet-like gas diffusion layer. As a result, the sheet-like gas diffusion layer cut as described above was severely lifted along a radius of curvature of the roll, that is, exhibited poor spreading properties.

INDUSTRIAL APPLICABILITY

The gas diffusion layer produced by the present invention may be used as a fuel cell membrane.

Specifically, the gas diffusion layer produced by the present invention may be used as a membrane material, which is mounted between electrodes of a fuel cell and allows (i) degraded hydrogen ions and (ii) water generated by combining hydrogen and oxygen to pass therethrough.

The invention claimed is:

1. A method for producing a roll of gas diffusion layer sheet, comprising:
   (i) performing heat treatment on a cellulose fiber as a carbon fiber precursor at a temperature of 1,750 to 2,450° C. to prepare a carbon fiber having a strength of 0.5 to 1.2 Gpa and a modulus of 10 to 100 Gpa;
   (ii) cutting the prepared carbon fiber in a length of 3 to 56 mm to prepare carbon fiber chops, and then introducing the carbon fiber chops into a paper pulp-manufacturing apparatus along with a binder fiber, a surfactant, a thickener, and an anti-foaming agent, so as to prepare a carbon paper sheet;
   (iii) impregnating the prepared carbon paper sheet with a resin, carbonizing the resin-impregnated carbon paper sheet at 1,800 to 2,400° C., and forming a microporous polytetrafluoroethylene resin layer on one surface of the carbonized carbon paper, so as to prepare a gas diffusion layer sheet; and
   (iv) winding the prepared gas diffusion layer sheet on a roll to give the roll of gas diffusion layer sheet,
   wherein the carbon fiber has a diameter of 6 to 10 μm, an electrical resistivity of 0.0001 to 0.9 Ω·cm, and a density of 1.4 to 1.5 g/cm³, and wherein the carbon paper sheet produced in (ii) has a weight of 15 to 100 g/m².

2. The method according to claim 1, wherein the resin used for impregnating the carbon paper sheet is one selected from the group consisting of a phenol resin and a polyvinylphenol resin.

3. The method according to claim 1, wherein the cellulose fiber is one selected from the group consisting of an acetate fiber, a rayon fiber, a Lyocell fiber, a cotton fiber, and a lignin fiber.

\* \* \* \* \*